(12) United States Patent
Fey

(10) Patent No.: US 11,879,406 B2
(45) Date of Patent: Jan. 23, 2024

(54) METHOD, COMPUTING UNIT, AND COMPUTER PROGRAM FOR OPERATING AN INTERNAL-COMBUSTION ENGINE

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/170,318

(22) Filed: Feb. 16, 2023

(65) Prior Publication Data
US 2023/0258140 A1 Aug. 17, 2023

(30) Foreign Application Priority Data
Feb. 17, 2022 (DE) .................... 10 2022 201 647.5

(51) Int. Cl.
*F02D 41/02* (2006.01)
*F02D 41/14* (2006.01)
(Continued)

(52) U.S. Cl.
CPC ......... *F02D 41/0295* (2013.01); *F01N 9/005* (2013.01); *F01N 11/007* (2013.01); *F02D 41/1441* (2013.01); *F02D 41/1454* (2013.01); *F02D 41/1476* (2013.01); *F01N 3/101* (2013.01); *F01N 2560/025* (2013.01); *F01N 2560/14* (2013.01); *F01N 2900/0408* (2013.01); *F01N 2900/0412* (2013.01); *F01N 2900/1402* (2013.01); *F01N 2900/1624* (2013.01);
(Continued)

(58) Field of Classification Search
CPC ........ F01N 3/101; F01N 9/005; F01N 11/007; F01N 2560/025; F01N 2560/14; F01N 2900/0408; F01N 2900/0412; F01N 2900/1402; F01N 2900/1624; F02D 41/0295; F02D 41/1441; F02D 41/1454; F02D 41/1476; F02D 41/1487; F02D 2200/0814; F02D 2200/0816; F02D 2041/1433
USPC .......................................... 60/276, 285, 299
See application file for complete search history.

(56) References Cited

U.S. PATENT DOCUMENTS

2020/0116095 A1* 4/2020 Knopp ................ F02D 41/1446

FOREIGN PATENT DOCUMENTS

| DE | 102016222418 A1 | 5/2018 |
| DE | 102018216980 A1 | 4/2020 |

(Continued)

*Primary Examiner* — Jorge L Leon, Jr.
(74) *Attorney, Agent, or Firm* — Michael Best & Friedrich LLP

(57) ABSTRACT

A method for operating an internal-combustion engine having an exhaust gas catalyst, a first exhaust gas sensor upstream of the exhaust gas catalyst and a second exhaust gas sensor downstream of the exhaust gas catalyst. A fill level of an exhaust gas component that can be stored in the exhaust gas catalyst is determined using a theoretical catalyst model, into which, as the input value, a signal of the first exhaust gas sensor (a first signal); a signal of the second exhaust gas sensor (a second signal); and a target signal are provided. The target signal corresponds to the signal that would be expected at the determined fill level in the exhaust gas catalyst. The catalyst model is reinitiated when the deviation of the second signal from the target signal exceeds a predetermined threshold value. The fill level is also regulated, and an air-fuel mixture is adjusted.

10 Claims, 2 Drawing Sheets

(51) Int. Cl.
 *F01N 9/00* (2006.01)
 *F01N 11/00* (2006.01)
 *F01N 3/10* (2006.01)
(52) U.S. Cl.
 CPC .. *F02D 41/1487* (2013.01); *F02D 2041/1433* (2013.01); *F02D 2200/0814* (2013.01); *F02D 2200/0816* (2013.01)

(56) References Cited

FOREIGN PATENT DOCUMENTS

| | | |
|---|---|---|
| DE | 102018251720 A1 | 7/2020 |
| DE | 102019201293 A1 | 7/2020 |

\* cited by examiner

METHOD, COMPUTING UNIT, AND COMPUTER PROGRAM FOR OPERATING AN INTERNAL-COMBUSTION ENGINE

BACKGROUND OF THE INVENTION

The present invention relates to a method for operating an internal-combustion engine as well as a computing unit and a computer program for carrying out such a method.

In internal-combustion engines of motor vehicles, for example diesel engines, gasoline engines, or rotary piston engines, in case of an incomplete combustion of the air-fuel mixture, in addition to nitrogen ($N_2$), carbon dioxide ($CO_2$) and water ($H_2O$), a variety of combustion products are expelled, of which at least hydrocarbons (HC), carbon monoxide (CO), and nitrogen oxides ($NO_x$) are limited by law. The applicable exhaust limits for motor vehicles can be met only with a catalytic exhaust aftertreatment according to the modern prior art. By using, for example, a three-way catalyst, said pollutant components can be converted into relatively harmless exhaust gas components, such as carbon dioxide, nitrogen, and water.

A simultaneously high conversion rate for HC, CO, and NOx is only achieved in a narrow lambda range around the stoichiometric operating point (lambda=1), the so-called "catalyst window", for three-way catalysts. Typically, a lambda regulation is used in order to operate the catalyst in the catalyst window based on the signals from lambda sensors in front of and behind the catalyst. To regulate the lambda value before the catalyst, the oxygen content of the exhaust gas before the catalyst is measured with the lambda sensor. Depending on this reading, the regulation corrects the amount of fuel supplied to the internal-combustion engine. For a more precise regulation, the exhaust gas behind the catalyst is additionally analyzed with a further lambda sensor. This signal is used for a guide regulation superimposed on the lambda regulation upstream of the catalyst. The lambda sensor behind the catalyst is typically a jump lambda sensor, which has a very steep characteristic curve at lambda=1 and therefore can display lambda=1 very accurately.

In addition to the guide regulation, which generally only regulates small deviations from lambda=1 and is designed to be comparatively slow, modern internal-combustion engine control systems typically have a functionality that ensures that the catalyst window is quickly reached again after large deviations from lambda=1 in the form of a lambda pre-control.

Many prevailing regulation concepts have the disadvantage that they only detect an exit from the catalyst window late on the basis of the voltage of the jump lambda sensor behind the catalyst.

An alternative to regulating the three-way catalyst based on the signal of a lambda sensor behind the catalyst is a regulation of the average oxygen fill level of the catalyst. Because this average fill level is not measurable, it can only be modeled using a path model. Such a type of regulation can detect and respond to impending breakthroughs at an early stage before they actually occur. A corresponding model-based regulation of the fill level of a three-way catalyst based on the kinetics of the most important reactions carried out in the catalyst and the oxygen storage capability is described in DE 10 2016 222 418 A1. Such model-based catalyst regulation can also include stored sets of model parameters. An adaptation of the storage capability of the catalyst depending on the prevailing operating point is also possible. Such methods are known, for example from DE 10 2018 216 980 A1 and DE 10 2018 251 720 A1.

SUMMARY OF THE INVENTION

According to the invention, a method for operating an internal-combustion engine as well as a computing unit and a computer program for carrying out said method having the features of the independent claims are proposed. Advantageous configurations are the subject-matter of the subclaims and the following description.

In particular, the invention addresses situations in which an offset between the lambda in front of the catalyst and the lambda behind the catalyst is not correctly indicated in the exhaust gas system at least under stationary engine operating conditions. For example, measurements with various jump and broadband lambda sensors behind a catalyst have shown that, in practice, such lambda sensors, which are mostly used as a reference sensor behind a catalyst, often do not correctly indicate larger offsets, in particular in terms of the amount. The offset is often underestimated. For example, cross-sensitivities to certain exhaust gas components such as hydrogen or temperature dependencies or dependencies on the engine operating point, which are not sufficiently considered in the sensor characteristic curve, or the usually flat characteristic of the voltage lambda characteristic curve offside from lambda=1, are considered possible causes for such an "ametropia."

Therefore, in the context of the invention, a further improved model-based regulation of a catalyst is presented, which detects and prevents an exit from the catalyst window early. This is achieved by an adaptation of relatively large offsets between the lambda upstream of the catalyst and the lambda downstream of the catalyst, which can quickly and robustly compensate for the actual offset present even in the case of an ametropic reference sensor.

A method according to the invention for controlling an internal-combustion engine having an exhaust gas system with an exhaust gas catalyst and at least two exhaust gas sensors, wherein a first exhaust gas sensor is arranged upstream of the exhaust gas catalyst and at least a second exhaust gas sensor is arranged downstream of the exhaust gas catalyst, comprises a determination of a fill level of at least one exhaust gas component that can be stored in the catalyst using a theoretical catalyst model, into which, as the input value, at least one signal of the first exhaust gas sensor enters as a first signal; a sensing of a signal of the second exhaust gas sensor downstream of the exhaust gas catalyst as a second signal; a detection of a deviation of the second signal from a target signal, wherein the target signal corresponds to the signal that would be expected at the determined fill level; a reinitiation of the catalyst model when the deviation of the second signal from the target signal exceeds a predetermined threshold value such that the determined fill level after the reinitiation causes a target signal corresponding to the sensed second signal; a regulation of the fill level by adjusting an air-fuel mixture supplied to the internal-combustion engine according to a target fill level, in particular a fill level leading to lambda=1 behind the catalyst, based on the determined fill level; a detection of a deviation between the first and the second signal after the reinitiation of the catalyst model and after the regulation of the fill level to the target fill level; a detection of a momentary target value for the second signal as the first target value;

an adjustment of an air-fuel mixture supplied to the internal-combustion engine such that the second signal is indicative of a lambda value of one by changing the target value for the second signal to a second target value; and a detection of a deviation between the first and second target values.

The target value for the second signal (=lambda signal behind the catalyst) is usually applied as a program map depending on the engine operating conditions (speed and relative load).

Advantageously, the invention also comprises a correction of the first signal ("offset correction") by means of a correction value determined as a function of the deviation between the first and the second target values, such that the deviation between the first and the second signal is reduced. Thus, an effective correction of the lambda signal in front of the catalyst is enabled. The "offset" of the pre-cat lambda signal can be considered approximately independent of the exhaust gas lambda at the sensor position and other influencing variables, such as engine operating conditions, when appropriate switch-on conditions are present. A correction is therefore possible with a single value.

The regulation concept according to the invention has the basic advantage that it can detect an exiting of the catalyst window early on the basis of the modeled fill level and thus contributes to lower pollutant emissions and a more effective exhaust gas purification in general.

A reinitiation in the context of the present invention means a method step in which a measured value (in particular the second signal) is used in order to change parameters of the computational procedure (the theoretical catalyst model) so that, when processing the input variable(s) in the computational procedure, the catalyst fill level results such that the measured signal matches the modeled fill level.

Advantageously, the first exhaust gas sensor is a broadband lambda sensor and/or the second exhaust gas sensor is a jump lambda sensor, and/or the first and/or second signal comprises lambda values of the exhaust gas of the internal-combustion engine. A broadband lambda sensor is in particular suitable for use upstream of the exhaust gas catalyst, because a wide range of values can be traversed at this point during operation of the internal-combustion engine, while downstream of the catalyst the high precision of a jump lambda sensor contributes in a narrow range of values to safely monitoring the exhaust gas purification. This reduces uncertainties in the catalyst model by adapting, based on a in particular reliable signal (the jump lambda sensor having a in particular steep characteristic curve in the range of lambda=1), a signal with greater uncertainty (the broadband lambda sensor having a significantly flatter characteristic curve and a greater measurement inaccuracy as a result). However, other exhaust gas sensors associated with the invention are also useful, in particular those that measure or determine a concentration of an exhaust gas component, for example, nitrogen oxide sensors.

The at least one exhaust gas component in particular comprises oxygen. This is in particular relevant for the functionality, in particular the conversion capacity of the exhaust gas catalyst.

The correction value is preferably calculated as a product of the deviation between the first and the second target value with a attenuation factor, in particular selected from a value range between zero and one. Thus, an over-compensation and an "upsurge" of the correction can be avoided.

The attenuation factor is preferably selected smaller as a distance between the second signal and the target signal increases. This takes into account the fact that the lambda sensor behind the catalyst provides particularly reliable values at a lambda value of one (i.e. in the vicinity of the target signal in a normal operation mode), whereas with increasing distance of the lambda value from one (i.e. further away from a regular target signal), the measured values are less reliable.

The correction of the first signal is preferably carried out by adding the correction value to the first signal. In particular, this results in an especially computationally economic correction when both signals already have a lambda value or if there is a linear dependence between the signal and the associated lambda value.

The invention will be described below using the example of a three-way catalyst. The embodiments are also transferable to other types of catalysts, mutatis mutandis, and the invention is not limited to the use of a three-way catalyst. In principle, any conceivable types of exhaust gas catalysts capable of storing at least one exhaust gas component can be used.

The core of the invention is to bring the modeled fill levels of the catalyst initially into a defined state by reinitiating based on the signal of a lambda sensor behind the catalyst, in which state the fill levels of the real catalyst and the modeled fill levels at least approximately match. Following this reinitiation, the fill level is regulated, in which minimum emissions and lambda=1 are expected behind the catalyst. After this fill level is regulated, the deviation of the lambda of 1 measured with the aid of the lambda sensor behind the catalyst is actually detected. This deviation corresponds—with an ideal sensor—to the existing offset between the lambda in front of and behind the catalyst.

However, an ametropia of the reference sensor can cause the indicated "presumed" lambda offset to not correspond to the actual offset. Therefore, the invention provides that, immediately after the detection of the presumed offset, the air-fuel mixture is adjusted via a change of the desired lambda behind the catalyst until the reference sensor behind the catalyst indicates lambda=1. The change of the target lambdas behind the catalyst until the reference sensor behind the catalyst indicates lambda=1 corresponds to the actual lambda offset. It is thereby exploited that the reference sensor generally has a very high accuracy in the lambda=1 area, unlike offside of the lambda=1. Moreover, over the temporal progression of the change in the target lambda, it is considered that the final path dynamics result in a delayed response of the reference sensor behind the catalyst to a displacement of the air-fuel mixture.

This immediate plausibility of the presumed offset results in a higher robustness and a higher speed of the adaptation, because the offset is no longer overestimated or underestimated, even in the case of a ametropia of the reference sensor, but rather, by the associated displacement of the air-fuel mixture, also leads immediately to the compensation of the lambda deviation behind the catalyst of lambda=1 and thus to lower emissions.

Fluctuations of the lambda behind the catalyst in dynamic travel operation and tolerances of the lambda sensor behind the catalyst are accounted for by low-pass filtering of the sensor signal and an attenuation factor that causes the determined offset to only be adopted or adjusted proportionately. The robustness of the method is thereby increased and an over-compensation of the offset is avoided. The method can be performed several times in a row until the deviation of the lambda value of 1, actually measured behind the catalyst, is sufficiently small. Thus, an existing offset can be fully adapted within a short time. The reliability and run frequency requirements of on-board diagnostics depending on the determined lambda offset, can be better met.

A model-based regulation of a catalyst has the advantage that an impending exit from the catalyst window can be detected earlier than a guide regulation based on the signal of an exhaust gas sensor behind the catalyst, so that an exit from the catalyst window can be countered by an early targeted correction of the air-fuel mixture before it actually occurs. By extending a compensation of measurement and model uncertainties with the rapid lambda offset adaptation according to the invention, the robustness of the model-based regulation can be further improved. In particular, larger lambda offsets in terms of amount can be adapted faster and more robustly at the same time. The emissions in real-world travel can thereby be further reduced. More stringent legal requirements can be met at a lower cost for the catalyst.

The invention is described herein using the example of an exhaust gas system comprising, in a successive direction of flow, a broadband lambda sensor, a three-way catalyst, and a jump lambda sensor. However, further or other catalysts, sensors and additional components, for example particulate filters, can also be provided, which at least do not adversely affect an application of the method.

The present invention assumes an adaptive catalyst model. For example, a catalyst model can be provided that realizes a multi-stage adaptation, with which uncertainties of measurement or model values that are input into the path model underlying the model and uncertainties of the path model are compensated for.

For example, such multi-step adaptation combines a continuously operating, very accurate adaptation of minor deviations and a discontinuous, quick correction of major deviations.

The continuous adaptation and the discontinuous correction can be based on signal values from different signal value ranges of a sensor, in particular a lambda sensor arranged downstream of the catalyst in the exhaust gas stream and thus on the output side, but wherein two basically different pieces of information are derived from these signal values. Such a model allows a consideration of the different validity of the signal values from the different signal value ranges with respect to the exhaust gas composition and with respect to the fill level of the at least one exhaust gas component in the catalyst.

Moreover, multiple signal value ranges can be provided, in which the continuous adaptation alone, the discontinuous correction alone, or both together are active.

In the intermittent correction, a modeled fill level is corrected, for example, when the voltage of an output-side lambda sensor indicates a breakthrough of rich or lean exhaust gas behind the catalyst and thus an actual (oxygen) fill level that is too low or too high, corresponding to the actual fill level. This correction is made discontinuously in order to be able to evaluate the reaction of the voltage of the lambda sensor behind the catalyst. Because this reaction is delayed due to the path dead time and the storage behavior of the catalyst, the adaptive catalyst model can in particular provide for the correction to be performed one time when the lambda value of the signal of the lambda sensor arranged downstream of the catalyst permits an inference of the actual (oxygen) fill level in the catalyst.

The invention builds on this discontinuous correction and supplements it with a lambda offset adaptation, because it has been discovered that a particularly well-defined state is present in a state after such a correction of the modeled fill level, which allows as precise a determination as possible of the offset of the lambda sensor upstream of the catalyst based on the signal of the lambda sensor downstream of the catalyst.

For example, in the aforementioned continuous adaptation, the lambda signal of a jump lambda sensor behind the catalyst is compared to a modeled lambda signal behind the catalyst. From this comparison, a lambda offset can be derived between the lambda value upstream of the catalyst and the lambda value downstream of the catalyst. For example, with the lambda offset, a lambda target formed by a pre-control is corrected. However, this continuous adaptation works significantly slower than the discontinuous correction just described and is therefore not suitable for remedying large offsets, because reaching the catalyst window would thereby be greatly delayed. The present invention in particular advantageously closes precisely this gap in cases of large offsets of the lambda sensor upstream of the catalyst.

A computing unit according to the invention, e.g. a control unit of a vehicle, is configured, in particular in terms of program technology, so as to carry out a method according to the invention.

The implementation of a method according to the invention in the form of a computer program or computer program product with program code for carrying out all method steps is also advantageous, because this results in particularly low costs, in particular if an executing control device is also used for further tasks and is therefore present in any event. Suitable data carriers for providing the computer program are, in particular, magnetic, optical, and electric storage media, such as hard disks, flash memory, EEPROMs, DVDs, and others. A download of a program via computer networks (Internet, Intranet, etc.) is also possible.

BRIEF DESCRIPTION OF THE DRAWINGS

Additional advantages and configurations of the invention result from the description and the enclosed drawing.

The invention is illustrated schematically in the drawing on the basis of embodiment examples and is described in detail in the following with reference to the drawing.

DETAILED DESCRIPTION

Figure 1:
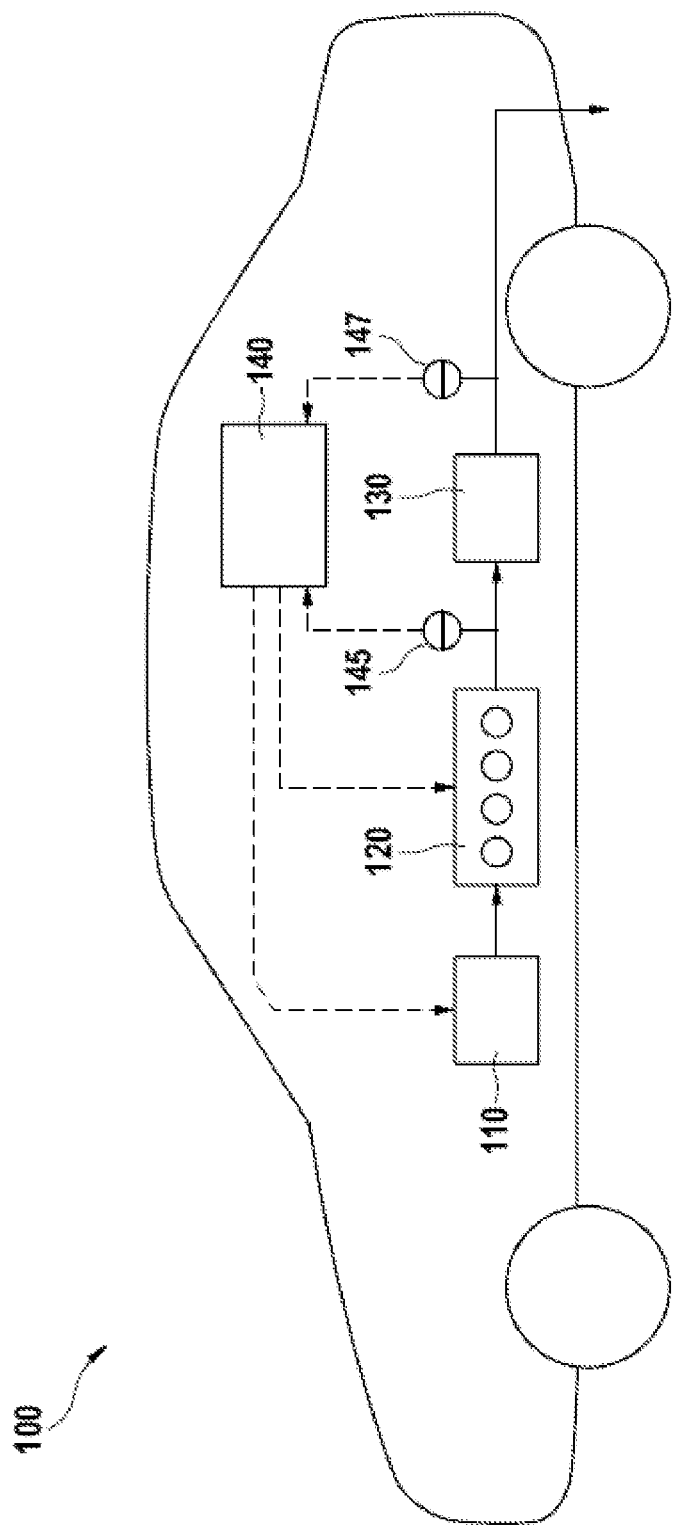
FIG. 1 shows a schematic illustration of a vehicle in which a method according to the invention can be applied.

In FIG. 1, a vehicle 100 in which a method according to the invention can be applied is shown schematically as a block diagram. The vehicle 100 is preferably configured so as to perform a method 200 according to FIG. 2 and comprises an internal-combustion engine 120, for example a gasoline engine, a catalyst 130, and a computing unit 140. Further, the vehicle 100 can comprise a fuel preparation device 110, for example, in the form of injection pump(s), turbocharger(s), etc. or combinations thereof.

Further, such a vehicle comprises (exhaust gas) sensors 145, 147, in particular lambda sensors, arranged upstream and downstream of the catalyst 130 in an exhaust gas system of the vehicle 100.

The computing unit controls, among other things, the operation of the internal-combustion engine 120, for example, by controlling ignition time points, valve opening times, as well as composition, amount, and/or pressure of the fuel-air mixture provided by the fuel preparation device 110.

Figure 2:
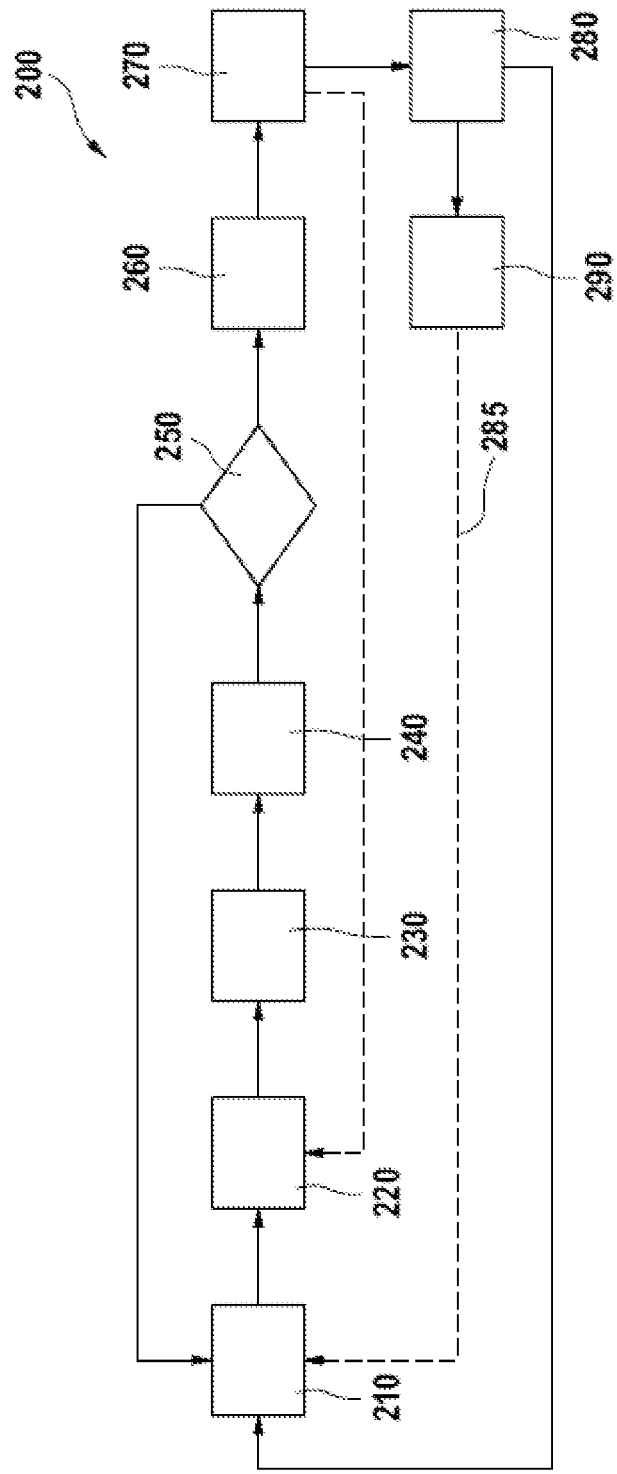
FIG. 2 shows an advantageous configuration of a method according to the invention in the form of a flow chart.

The computing unit 140 is advantageously configured so as to further perform the method 200 illustrated in FIG. 2 according to a preferred embodiment of the invention.

Exhaust gas created during operation of the internal-combustion engine 120 is supplied to the catalyst 130. Upstream of the catalyst 130, in a first step 210 of the method 200, by means of a first lambda sensor 145, the air count lambda of the exhaust gas is measured, and this first lambda value is transmitted to the computing unit 140.

In a step 220, depending on the lambda value determined in step 210 upstream of the catalyst 130, a fill level of at least one exhaust gas component in the catalyst 130 is calculated. This relates, for example, to an oxygen fill level, but a corresponding fill level can also be determined in the catalyst 130 for other exhaust gas components, for example, nitrogen oxides.

The catalyst accelerates and/or allows reactions of exhaust gas constituents with one another, such that harmful constituents, such as carbon monoxide, nitrogen oxides, and not fully combusted hydrocarbons, are reacted into relatively harmless products, such as water vapor, nitrogen, and carbon dioxide. Downstream of the catalyst 130, a second lambda value is determined by a second lambda sensor 147 in a step 230 and transmitted to the computing unit 140.

The first and second lambda values can deviate from one another at times or permanently, because the reactions in the catalyst 130 cause the compositions of the exhaust gases to deviate upstream and downstream of the catalyst 130. In addition, the exhaust gas takes some time to flow through the catalyst 130 (so-called dead time). This dead time is in particular dependent on a prevailing flow rate of the exhaust gas, i.e. a prevailing operating state of the internal-combustion engine 120. For example, operating the internal-combustion engine 120 at full load produces a higher amount of exhaust gas per unit of time than during an idling operation. As a result, the respective dead time changes as a function of the operating state of the internal-combustion engine 120, because the volume of the catalyst 130 is constant.

More simply, these explanations each assume, by way of example, an emission minimum at a lambda value of one. However, the invention is equally applicable when the target level corresponds to a lambda target that deviates from lambda=1 in order to achieve minimum emissions.

As mentioned, the present invention is based on the signal from the exhaust gas sensor 147 downstream of the catalyst 130. It makes particular use of the fact that, if the lambda sensor 147 behind the catalyst 130 clearly indicates a high or low voltage, the voltage signal correlates to the prevailing (oxygen) fill level in the catalyst 130. This is in particular the case if the sensor voltage does not correspond to a lambda in the range of 1. In this case, the catalyst 130 is freed of oxygen or filled with oxygen such that rich or lean exhaust gas breaks through. This is exploited in order to reinitiate one or more modeled fill levels, such as the modeled oxygen fill levels in multiple axial regions of the catalyst 130, when a clearly high or low voltage of the lambda sensor 147 occurs behind the catalyst 130.

Accordingly, in a step 240, a deviation between the sensor signal of the lambda sensor 147 determined in step 230 from a target signal that corresponds to a signal expected from the catalyst fill level determined in step 220. The target signal can correspond in a stationary operating state of the internal-combustion engine 120, i.e. an operating state with a constant load requirement, in particular to a lambda value of one, or a lambda value in the vicinity of one.

In a step 250, the deviation of the actual lambda value determined in step 240 from the expected value is compared to a threshold value. If the deviation is less than the threshold value, the method 200 returns to step 210. If the deviation, on the other hand, reaches or exceeds the threshold value, then the method 200 continues to a step 260 in which the catalyst model is reinitiated based on the sensor signal determined downstream of the catalyst 130. This reinitiation 260 causes the modeled fill levels of the catalyst 130 to be brought to a defined state, at least approximately matching the corresponding fill levels of the real catalyst 130 well.

Such discontinuous correction or reinitiation 260 of the modeled fill levels results in a deviation of the average modeled fill level from a predetermined target value. This deviation is subsequently eliminated in a step 270. It results in a shift of the air-fuel mixture towards the level regulation target and very quickly brings the catalyst 130 towards the catalyst window. Thus, it immediately leads to an emission improvement and simultaneously brings the catalyst 130 into a defined state where, as expected, lambda=1 (or a lambda value close to one) should result behind the catalyst 130. However, the catalyst window is actually reached and lambda=1 will actually result behind the catalyst 130 only when the signal from the lambda sensor 145 upstream of the catalyst 130 on which the modeling of the regulated oxygen fill level is based has no offset. If this is the case, then the catalyst 130 does not have a lambda=1, but rather a lambda value deviating from lambda=1 by this offset.

As soon as the oxygen fill level is adjusted after reinitiation (in step 260), in a step 280, the deviation of the actual lambda value (actual value) behind the catalyst 130 of lambda=1 (or from the lambda target value) is sensed using the lambda sensor 147 arranged behind the catalyst 130. However, the lambda sensor 147 behind the catalyst 130 can also have a measurement inaccuracy, i.e. this deviation can also be caused by the lambda sensor 147.

Thus, in a step 290, in order to be able to determine the actual lambda offset without influence from a measurement inaccuracy of the lambda sensor 147, the lambda target behind the catalyst is changed so that lambda=1 actually results behind the catalyst 130. This change in the lambda target then corresponds to the actual lambda offset. It is exploited that the lambda sensor 147 typically has a very high accuracy in the lambda=1 range. Moreover, over the temporal progression of the change in the lambda target value, it is considered that the final path dynamics result in a delayed response of the lambda sensor 147 behind the catalyst to a displacement of the air-fuel mixture.

Based on this change in the lambda target, a correction value 285 is determined, which is subsequently considered when determining the lambda value upstream of the catalyst 130. In particular, this correction value 285 is a number that is added to the lambda value measured in step 210 upstream of the catalyst 130. It is self-evident that the sensing of the deviation is only useful if the signal of the lambda sensor 147 behind the catalyst 130 is trusted and this sensor 147 is in particular operationally ready. Optionally, a wait time or a minimum amount of exhaust gas can also be provided, which must be awaited or passed before the deviation is detected. This can in particular take into account the dead time already mentioned.

After step 280, method 200 returns to step 210, wherein, in the recent step 210, the determined correction value 285 is considered when determining the lambda value upstream of catalyst 130.

Because in dynamic travel mode, it is to be assumed that the lambda value behind the catalyst 130 is not constant but can fluctuate around an average, the signal of the lambda sensor 147 behind the catalyst 130 is preferably low-pass filtered.

Because the lambda value accuracy of the signal of a jump lambda sensor 147 behind the catalyst 130 offside of lambda=1 can be limited by temperature effects, cross-sensitivities, and the flat characteristic of the voltage-lambda characteristic curve, it is also provided that the determined offset is adopted with the aid of an attenuation factor only proportionately as the correction value 285, e.g. only 50%. Preferably, the attenuation further away from lambda=1 is amplified and further reduced as the measured sensor signal becomes more dense at lambda=1, because the lambda accuracy is highest there. The robustness of the offset correction is increased by the proportionate takeover, because this safely avoids an over-compensation for the offset, which could lead to an upsurge in the offset adaptation and increased emissions.

The correction value 285 determined in this way is preferably used for the adaptation or correction of the signal of the lambda sensor 145 in front of the catalyst 130. With an assumed attenuation factor of 50%, the offset between the lambda value in front of the catalyst 130 and the lambda value behind the catalyst 130 after a first adaptation step is only half as large as originally.

If the voltage of the lambda sensor 147 behind the catalyst 130 again indicates a clearly high or low voltage, the method 200 is repeated, optionally multiple times. Optionally, the method 200 can also be repeated if the signal of the lambda sensor 147 behind the catalyst 130 is running in a direction other than that expected as a result of the reinitiation, e.g. if the sensor voltage initially runs towards a higher sensor voltage but then back towards a low sensor voltage after reinitiation at a low sensor voltage. Because the attenuation factor is further reduced as the measured signal of the lambda sensor 147 becomes denser behind the catalyst 130 at lambda=1, more of the offset is proportionately adopted with each step. In this way, a lambda offset can also be fully adapted quickly and robustly in terms of amount by multiple successive reinitiation and adaptation steps.

The invention claimed is:

1. A method (200) for operating an internal-combustion engine (120) with an exhaust gas aftertreatment system including an exhaust gas catalyst (130), at least a first exhaust gas sensor (145) arranged upstream of the exhaust gas catalyst (130), and at least a second exhaust gas sensor (147) arranged downstream of the exhaust gas catalyst (130), the method comprising:
   sensing (210) at least one signal of the first exhaust gas sensor (145) as a first signal indicative of at least one exhaust gas component,
   determining (220) a current fill level of the at least one exhaust gas component in the exhaust gas catalyst (130) based on the first signal and a theoretical catalyst model of the exhaust gas catalyst (130),
   sensing (230) a signal of the second exhaust gas sensor (147) as a second signal indicative of the at least one exhaust gas component,
   determining (240) a first deviation of the second signal from a target signal corresponding to an expected signal based on the determined current fill level,
   reinitiating (260) the theoretical catalyst model when the first deviation of the second signal from the target signal exceeds a predetermined threshold value such that a corrected current fill level of the at least one exhaust gas component after the reinitiating (260) reduces the first deviation of the second signal from the target signal,
   adjusting (270) an air-fuel mixture supplied to the internal-combustion engine (120) based on the corrected current fill level so as to adjust a fill level of the at least one exhaust gas component in the exhaust gas catalyst (130) to a target fill level,
   determining (280) a second deviation between the first and the second signals after the reinitiating (260) of the theoretical catalyst model and after the adjusting (270) of the fill level to the target fill level,
   setting (290) a momentary target value of the second signal as a first target value, and
   adjusting (290) the air-fuel mixture such that the second signal is indicative of a lambda value of one by changing the first target value to a second target value.

2. The method (200) according to claim 1, wherein the first exhaust gas sensor (145) is a broadband lambda sensor.

3. The method (200) according to claim 2, wherein the second exhaust gas sensor (147) is a jump lambda sensor.

4. The method (200) according to claim 1, wherein the at least one exhaust gas component comprises oxygen.

5. The method (200) according to claim 1, further comprising:
   correcting the first signal by means of a correction value (285) determined as a function of a third deviation between the first and the second target values, such that the second deviation between the first and the second signal is reduced.

6. The method (200) according to claim 5, wherein the correction value (285) is calculated as a product of an attenuation factor and the second deviation between the first and the second signal.

7. The method (200) according to claim 6, wherein the attenuation factor decreases as the first deviation of the second signal from the target signal increases.

8. The method (200) according to claim 5, wherein the correcting of the first signal includes adding the correction value (285) to the first signal.

9. A computing unit (140) for operating an internal-combustion engine (120) with an exhaust gas aftertreatment system including an exhaust gas catalyst (130), at least a first exhaust gas sensor (145) arranged upstream of the exhaust gas catalyst (130), and at least a second exhaust gas sensor (147) arranged downstream of the exhaust gas catalyst (130), the computing unit configured to:
   sense (210) at least one signal of the first exhaust gas sensor (145) as a first signal indicative of at least one exhaust gas component,
   determine (220) a current fill level of the at least one exhaust gas component in the exhaust gas catalyst (130) based on the first signal and a theoretical catalyst model of the exhaust gas catalyst (130),
   sense (230) a signal of the second exhaust gas sensor (147) as a second signal indicative of the at least one exhaust gas component,
   determine (240) a first deviation of the second signal from a target signal corresponding to an expected signal based on the determined current fill level,
   reinitiate (260) the theoretical catalyst model when the first deviation of the second signal from the target signal exceeds a predetermined threshold value such that a corrected current fill level of the at least one exhaust gas component after the reinitiating (260) reduces the first deviation of the second signal from the target signal,
   adjust (270) an air-fuel mixture supplied to the internal-combustion engine (120) based on the corrected current fill level so as to adjust a fill level of the at least one exhaust gas component in the exhaust gas catalyst (130) to a target fill level, determine (280) a second deviation between the first and the second signals after the reinitiating (260) of the theoretical catalyst model and after the adjusting (270) of the fill level to the target fill level, set (290) a momentary target value of the second signal as a first target value, and adjust (290) the air-fuel mixture such that the second signal is indicative of a lambda value of one by changing the first target value to a second target value.

10. A non-transitory computer-readable storage medium containing operating instructions for an internal-combustion engine (120) with an exhaust gas aftertreatment system including an exhaust gas catalyst (130), at least a first exhaust gas sensor (145) arranged upstream of the exhaust gas catalyst (130), and at least a second exhaust gas sensor (147) arranged downstream of the exhaust gas catalyst (130), the operating instructions, when executed via a computer, are configured to:

sense (210) at least one signal of the first exhaust gas sensor (145) as a first signal indicative of at least one exhaust gas component, determine (220) a current fill level of the at least one exhaust gas component in the exhaust gas catalyst (130) based on the first signal and a theoretical catalyst model of the exhaust gas catalyst (130), sense (230) a signal of the second exhaust gas sensor (147) as a second signal indicative of the at least one exhaust gas component, determine (240) a first deviation of the second signal from a target signal corresponding to an expected signal based on the determined current fill level, reinitiate (260) the theoretical catalyst model when the first deviation of the second signal from the target signal exceeds a predetermined threshold value such that a corrected current fill level of the at least one exhaust gas component after the reinitiating (260) reduces the first deviation of the second signal from the target signal, adjust (270) an air-fuel mixture supplied to the internal-combustion engine (120) based on the corrected current fill level so as to adjust a fill level of the at least one exhaust gas component in the exhaust gas catalyst (130) to a target fill level, determine (280) a second deviation between the first and the second signals after the reinitiating (260) of the theoretical catalyst model and after the adjusting (270) of the fill level to the target fill level, set (290) a momentary target value of the second signal as a first target value, and adjust (290) the air-fuel mixture such that the second signal is indicative of a lambda value of one by changing the first target value to a second target value.

* * * * *